United States Patent
Pang et al.

(10) Patent No.: US 11,115,445 B2
(45) Date of Patent: Sep. 7, 2021

(54) CONTENT TYPE AUTO DETECTION FOR ONLINE COLLABORATION SCREEN SHARING

(71) Applicant: Cisco Technology, Inc., San Jose, CA (US)

(72) Inventors: Bo Pang, Shanghai (CN); Jianjun Hu, Shanghai (CN); Gang Yang, Zhejiang (CN); Yong Yang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 120 days.

(21) Appl. No.: 16/414,554

(22) Filed: May 16, 2019

(65) Prior Publication Data
US 2020/0366721 A1 Nov. 19, 2020

(51) Int. Cl.
*H04L 29/06* (2006.01)

(52) U.S. Cl.
CPC ........ *H04L 65/403* (2013.01); *H04L 65/1069* (2013.01); *H04L 65/607* (2013.01); *H04L 65/80* (2013.01)

(58) Field of Classification Search
CPC ... H04L 65/403; H04L 65/80; H04L 65/1069; H04L 65/607
See application file for complete search history.

(56) References Cited

U.S. PATENT DOCUMENTS

| | | | | |
|---|---|---|---|---|
| 9,001,178 | B1* | 4/2015 | Leske | H04N 5/265 348/14.08 |
| 2007/0192481 | A1* | 8/2007 | Wei | H04L 43/08 709/224 |
| 2014/0289423 | A1 | 9/2014 | Kim et al. | |
| 2015/0063451 | A1* | 3/2015 | Zhu | H04N 19/137 375/240.09 |
| 2018/0034711 | A1* | 2/2018 | Gupta | H04L 65/1069 |
| 2019/0394527 | A1* | 12/2019 | Chandrasekhar | G06N 3/08 |

OTHER PUBLICATIONS

Suznjevic, Mirko et al. "User Behavior Detection Based on Statistical Traffic Analysis for Thin Client Services", (Jan. 2014); pdfs. semanticscholar; 10 pps.

(Continued)

*Primary Examiner* — Brian J. Gillis
*Assistant Examiner* — Juan C Turriate Gastulo
(74) *Attorney, Agent, or Firm* — Merchant & Gould P.C.

(57) ABSTRACT

Content determination, in an online collaboration environment, moved from each client to a server, where the server reviews signal characteristics to determine the content in the data stream, may be provided. First, an online collaboration server receives a data stream associated with an online collaboration session. A traffic analyzer at the frontend of the server analyzes the data stream to determine a signal characteristic. Based on the signal characteristic, the traffic analyzer generates a classification of a type of content in the data stream. This classification is sent to an online collaboration application at the client. The client can then adjust the encoding of the data based on the type of content in the data stream.

20 Claims, 10 Drawing Sheets

(56) References Cited

OTHER PUBLICATIONS

Uddin, Mostafa "Toward Open and Programmable Wireless Network Edge" (2016); Doctor of Philosophy (PhD), dissertation, Computer Science, Old Dominion University, DOI: 10.25777/xn1x-1n38https://digitalcommons.odu.edu/computerscience_etds/17UDDIN; 177 pps.

Anantavraslip, Isara et al. "Supervised Machine Learning Assisted Real-Time Flow Classification System a Real-Time Approach to Flow Classification" (Jan. 2010); Mediatum.ub.tum.de; pp. No. 01-82 (223 pps.).

Lee, Jeongkeun et al. "meSDN: Mobile Extension of SDN" (2014); synergylabs, 8 pps.

* cited by examiner

CONTENT TYPE AUTO DETECTION FOR ONLINE COLLABORATION SCREEN SHARING

TECHNICAL FIELD

The present disclosure relates generally to online collaboration applications executing with a computer network.

BACKGROUND

In an online collaboration, for example a videoconference or teleconference meeting with screen sharing on a user's computer, the user's shared desktop may be encoded into video or other format and then delivered from the client application to a server. Audiences may want to see different visual effects for video content compared to other content. For example, video content is expected to have high motion speed, in contrast, for text content, for example slideshows and screen sharing, the text and desktop representation is expected to have clear words, especially sharp word edges. These different desires for the output of an online collaboration system leads to different handling of the data.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
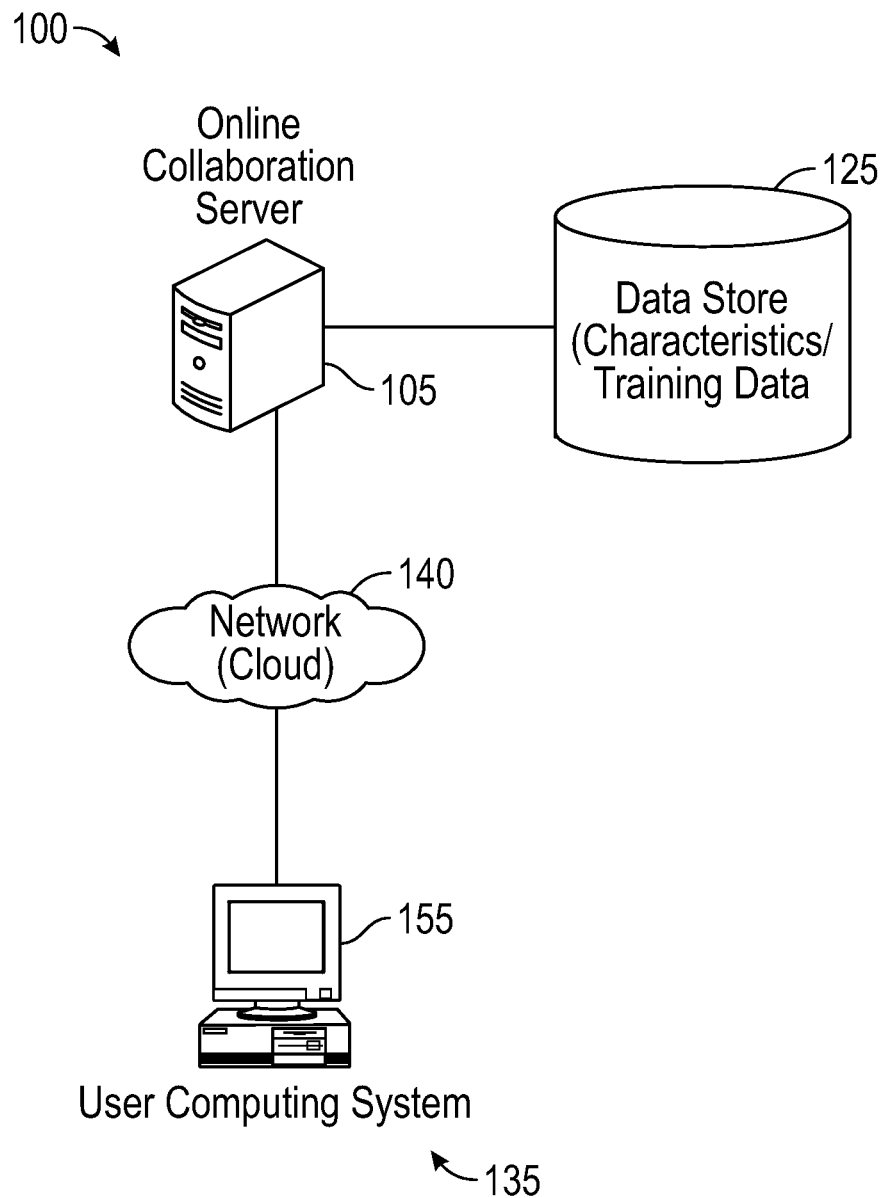
FIG. 1 shows an operating environment for classifying content in an online collaboration session in accordance with aspects of the present disclosure.

Content determination in an online collaboration environment, moved from each client to a server, where the server reviews signal characteristics to determine the content in the data stream, is provided. First, an online collaboration server receives a data stream associated with an online collaboration session. A traffic analyzer at the frontend of the server analyzes the data stream to determine a signal characteristic. Based on the signal characteristic, the traffic analyzer generates a classification of a type of content in the data stream. This classification is sent to an online collaboration application at the client. The client can then adjust the encoding of the data based on the type of content in the data stream.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

To address the concerns above, and other limitations, online collaboration services should offer two sets of encoding policies, a first for higher resolution data with a low framerate (e.g., text and desktop sharing) and a second for higher framerate data with lower resolution (e.g., video data). Thus, the embodiments herein can provide auto detection of content type to change between these different encoding policies. The embodiments introduce an Artificial Intelligence (AI) agent that can classify network traffic associated with an online collaboration session (e.g., an online meeting service that allows for the sharing of video of the participants, sharing of content on a desktop of a participant, etc.). The AI agent can execute at a server rather than a client. The server can auto detect content type(s), then, according to the identified content type, can tune the online collaboration application, executing at the client device, to optimize rendering effects, including resolution, framerate, bandwidth, etc.

Generally, in some past solutions, an AI agent executes at the client device to detect whether there is text or video in the sharing region on the user's desktop. Due to the variability of the content, this type of AI agent can often generate incorrect recognition results. For example, with a video stream, there can be a slide show presentation embedded in the video. This slide show may be perceived as text content, but actually the content is video. In contrast, sometimes in slide show presentations there is an image embedded. This image can be perceived as video, but the content is text.

Embodiments herein do not rely on the AI implementation at the client to recognize shared objects in content, from the client side. Rather, the embodiments herein can execute a traffic analysis AI algorithm at the server, to auto detect types of shared objects and/or content. This server-side AI algorithm can be deployed remotely in the stream delivery pathway at the server to analyze the data stream for the online collaboration session.

In the architecture, a traffic analysis component is deployed at the server frontend because the sharing stream is sent to the online collaboration service, at the server, for content mixing and dispatch. The traffic analysis component need not decode the data stream for the online collaboration session to identify the content and the content's objects. The traffic analysis component, in contrast, can directly analyze this shared data stream and extract and gauge one or more parameters or characteristics that characterize and/or measure this shared data stream. These characteristics can include one or more of, but is not limited to: package size (for example, from 0 bytes (or bits) to a maximal package size), package count per package size (for some sampling duration), a sampling duration (it should be noted that a short sampling duration can lead to analysis that is too sensitive, but too long a sampling duration can lead to detection delay), and/or a sampling rate (it should also be noted that a higher sampling rate can collect more information in one duration, but can impose a higher performance burden on the traffic analysis component at the server).

In an example configuration, a traffic analysis component can be executed as a sharing checkpoint at the server frontend that executes the online collaboration server. This traffic analysis component can periodically and/or continuously monitor and count the pass-by packages according to different package size. This data (and possibly other training data) can train the AI algorithm. Generally, many of the online collaboration services provide no sharing content type auto detection. The content, regardless of whether the content includes text and/or video, is perceived and managed as a unified content type, with the same encoding settings. When this unclassified content, in the sharing stream, is processed through the traffic analysis component, the traffic analysis component can generate different package spectrum(s), according to the sharing content type.

For example, if the client device is sharing a slideshow, the identified content type should be a "text" content type.

The traffic analysis component can analyze the package spectrum for the text content type and identify the characteristics of the text content type: a large package size but a small package count. In contrast a "video" content type can be analyzed by the traffic analysis component to determine the package spectrum of the video content type as large package sizes and a large package count. A training set of content with clean package spectrums (e.g., package spectrums that do not intermix content types) to train the AI algorithm (e.g., a Keras and Tensorflow algorithm) and create a stable traffic classifier. Then, the AI algorithm can be deployed by the traffic analysis component to analyze new data streams and provide auto-detection of the content type. Experiments and comparisons between the server-side traffic analysis component and a client-side AI solution can provide similar results.

However, the server-side solution provides certain technical advantages. The server-side traffic analysis component can detect and/or classify the type of content in the data stream. Yet, the server-side traffic analysis component need not decode the content as with the client-side AI solutions. Thus, the computation power or process cycle consumption is less for the server-side traffic analysis component. Further, the server-side traffic analysis component is easily scalable as there can be multiple, parallel deployments at a single server as opposed to multiple deployments at multiple client-side devices. The server-side traffic analysis component also allows for simple identification of various types of content by a small number of characteristics (e.g., package size, package count, time, etc.). Therefore, the embodiments herein provide several advantages over past solutions.

FIG. 1 shows an operating environment 100 for classifying content types in a data stream of an online collaboration session. An online collaboration session is an interaction, through video and/or audio, that also includes the sharing of data from the desktop of at least one of the user's computer. As shown in FIG. 1, operating environment 100 may comprise an online collaboration server 105 and a network 140. The online collaboration server 105 can receive data streams from the various participants in the online collaboration session and mix or combine those data streams for presentation on the users' computers. Further, the online collaboration server 105 may collect information about a data stream, associated with an online collaboration session, sent from one or more user computing system(s) 155, in a group of devices 135 involved in the online collaboration session. The data stream may be sent through a network 140. The online collaboration server 105 can provide information about the classification of the content in the data stream back to the one or more user computing devices 155. The classification information can be used, by the one or more user computing devices 155, to change or manage the encoder or other settings used to send the data. Online collaboration server 105 may be located inside or outside network 140, for example, in a cloud environment. The online collaboration server 105 can be any hardware and/or software, as described in conjunction with FIG. 11.

Network 140 may comprise, but is not limited to, an enterprise network and/or an outside network that may comprise an enterprise's communications backbone, the Internet, another local area network (LAN), on other wide area network (WAN), or other network that may connect computers and related devices across departments and interconnect online collaboration workgroups, facilitating the sharing of information in an online collaboration session. A network 140 may comprise a router, an access point, a user device (e.g., device 155), or other components or systems. A plurality of end use devices 135 may be connected to one or more of the network devices 140. The network 140 can comprise any hardware device or configured node on a LAN, WAN, or other network that allows a devices to connect through a communication standard. Network devices 140 can feature a processor, radio transmitters, and antennae, which facilitate connectivity between devices 155 and the network 140. The network devices 140 can be as described in conjunction with FIG. 11.

User devices 155 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device capable of accessing and using network 140. The user devices 155 can be any hardware and/or software, as described in conjunction with FIG. 11.

The data store 125 can be any type of data store, database, file system, and/or memory or storage. The data store 125 can store, manage, retrieve, etc. data associated with analyzing the data stream during an online collaboration session. The data store 125 may be hardware and/or software associated with the online collaboration server 105 or associated with another separate system as described in conjunction with FIG. 11. Regardless, the data store 125 may include at least a portion of the data described in conjunction with FIGS. 8A and 8B.

The elements described above of operating environment 100 (e.g., online collaboration server 105, data store 125, end user device 155, etc.) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 11, the elements of operating environment 100 may be practiced in a computing device 1100.

Consistent with embodiments of the disclosure, the user device 155 may be in communication over the network 140 to the online collaboration server 105 to send or receive a data stream associated with an online collaboration session. The online collaboration server 105 can receive the data streams from two or more user devices 155 during the online collaboration session. To optimize the efficiency of the data processing and to best utilize the network bandwidth, it is desired to ensure the best encoding of the data streams from the various user device 155. Hereinafter, provided in greater detail below, the process of classifying the content within the data streams and the optimization of the encoding based on the classifications is further described.

Figure 2A:
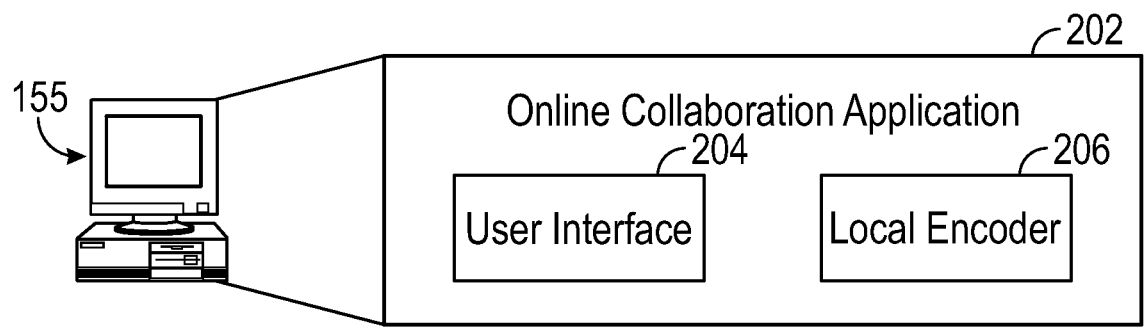
FIG. 2A shows an example of an online collaboration application in accordance with aspects of the present disclosure.

FIG. 2A shows an example of a user device 155. The user device 155 can include at least a client-side portion of an online collaboration application 202. The online collaboration application 202 can provide the interface between the user and the online collaboration service 208 (described hereinafter) executed on the online collaboration server 105. Thus, the online collaboration application 202 receives the inputs and data from the client-side of the online collaboration session and provides that data to the online collaboration server 105. Likewise, the online collaboration application 202 receives the inbound data stream from the online collaboration server 105 and presents that data to the user. In at least some configurations, the online collaboration application 202 comprises a user interface 204 and a local encoder 206.

The user interface 204 provides the inbound data to the user. Thus, the user interface 204 can display any visual data (e.g., video, slide presentations, and other user's desktops, etc.) to a display device, can output any audio data (e.g., through a speaker), or can provide other possible data to the user. Likewise, the user interface 204 can also receive data from the user or the user device 155. For example, the user interface 204 can receive video input from a camera and/or audio input from a microphone to provide as an output data stream. Further, the user interface 204 may send a depiction or representation of at least a portion of the user's desktop (or other computer data) as an outbound data stream. The outbound data stream may be sent to the local encoder 206 for conversion and transmission to the online collaboration server 105.

The local encoder 206 can be any device, circuit, transducer, software program, algorithm, etc., that converts the data or information associated with the online collaboration session from one format or code to another, for the purpose of conducting the online collaboration session. Thus, the local encoder 206 can receive the inbound data stream from the online collaboration server 105 and convert that data into a form presentable by the user interface 204. Likewise, the local encoder 206 can receive an outbound data stream from the user interface 204 and convert that data stream into a format suitable to be sent over the network 140 to the online collaboration server 105. In at least some configurations, the settings for the local encoder 206 can be changed. For example, the online collaboration server 105 can send a directive or command to the local encoder 206 to change the settings based on the classification of content in the outbound data stream. The local encoder 206 may adjust the settings in response to this directive. In other configurations, the online collaboration server 105 may send content classification data to the local encoder 206. In response to the content classification data, the local encoder 206 may change the settings based on the classification of content in the outbound data stream.

Figure 2B:
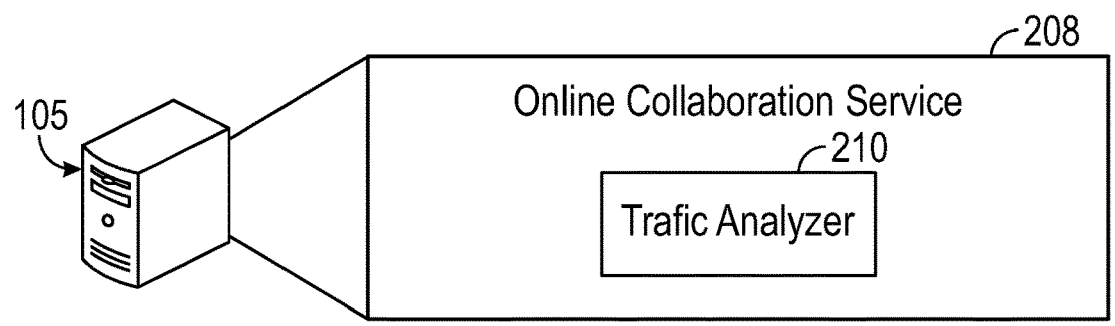
FIG. 2B shows an example of a server that may be executing an online collaboration service in accordance with aspects of the present disclosure.

An exemplary embodiment of the online collaboration server 105 may be as shown in FIG. 2B. The online collaboration server 105 can include at least a second portion or the online collaboration service 208. The online collaboration service 208 can be any software and/or hardware that provides the online collaboration session. Thus, the online collaboration service 208 can mix the various data streams provided from the two or more user devices 155 involved in the online collaboration session and send the mixed signal to the two or more user devices 155. Thus, the online collaboration service 208 manages numerous inbound and outbound data streams. In at least some configurations, the online collaboration service 208 can include or communicate with a frontend traffic analyzer 210 to review and analyse the inbound data streams.

The traffic analyzer 210 can analyze the inbound data streams from the two or more user devices 155 involved in the online collaboration session. This analysis can include characterizing the content of the data streams based on the characteristics of the signal being received. Based on this analysis, the traffic analyzer 210 can send the classification information to the local encoder 206 or provide a directive to the local encoder 206 regarding how the local encoder 206 should process or encode the data stream. Hereinafter, the process of analyzing the inbound data steam will be described in more detail.

Figure 3A:
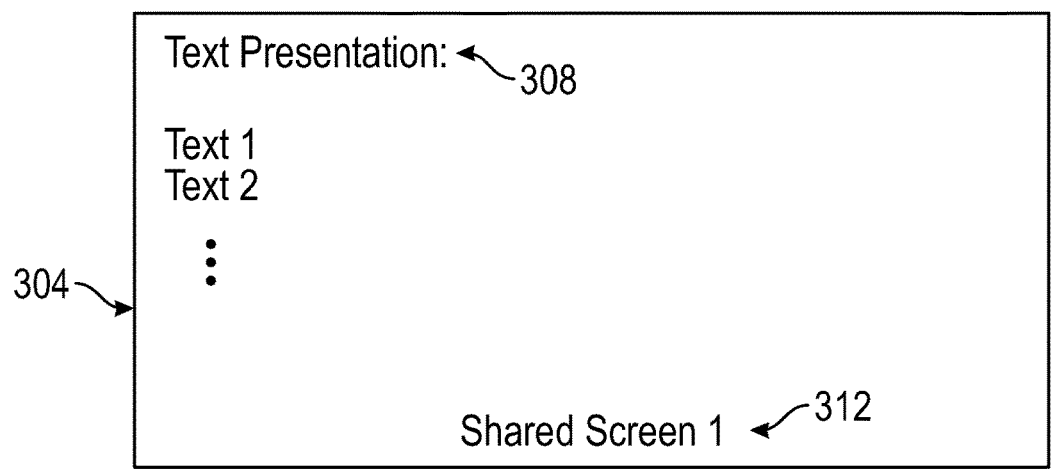
FIG. 3A shows example text-based content that may be shared in the online collaboration session in accordance with aspects of the present disclosure.

An example of a user interface 304 and the concomitant data associated therewith may be a shown in FIG. 3A. The user interface display 304 can be a shared screen 312 which represents at least a portion of the desktop of the user device 155. This shared screen 312 may be provided as output by the user interface 204 to the user and to the local encoder 206. In the display 304, the shared screen 312 may include text data or a text presentation 308. Thus, the data within the shared screen 1 312 may not include video or other multimedia data.

Figure 3B:
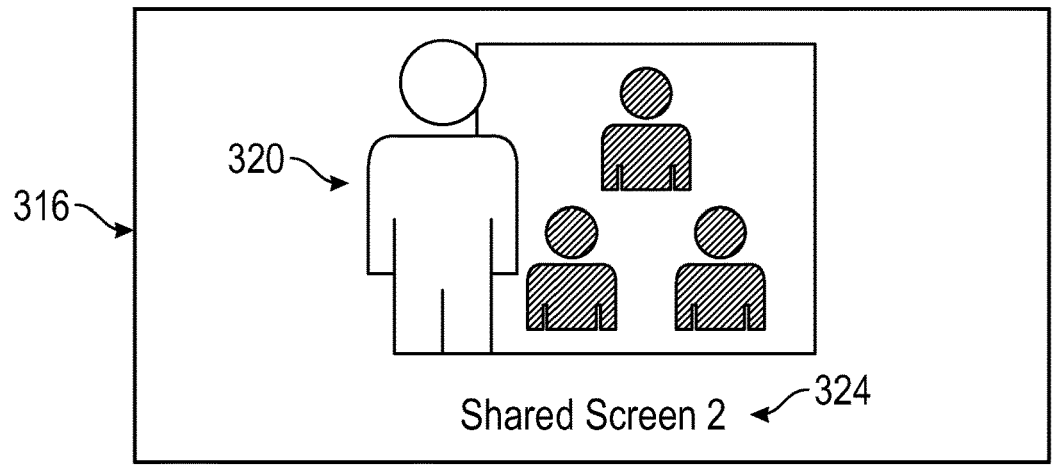
FIG. 3B shows example video-based content that may be shared in the online collaboration session in accordance with aspects of the present disclosure.

An example of another user interface 316 may be as shown in FIG. 3B. The user interface 316 can be a shared screen 324 which represents at least a portion of the desktop of the user device 155. This shared screen 324 may be provided as output by the user interface 204 to the user and to the local encoder 206. In the display 316, the shared screen 324 may include video data or a video conferencing presentation 320. Thus, the data within the second shared screen 324 may include video data. It should be noted that other content types are possible, such as audio, still picture data, multimedia, etc. Thus, the user interfaces 304 and 316 are provided as examples and are not exhaustive of all types of content that may be classified.

Figure 4:
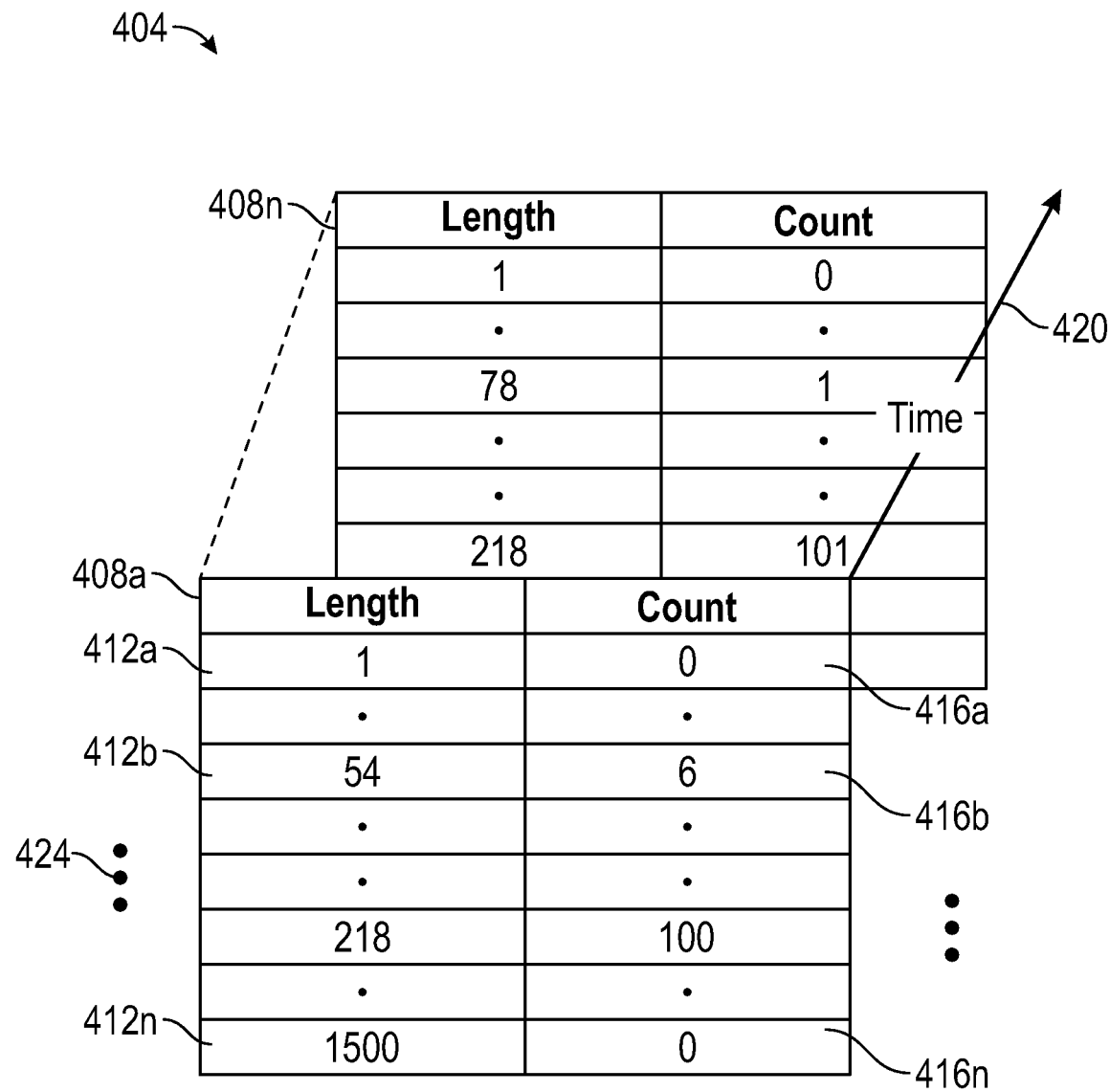
FIG. 4 shows a sampling regime for content in the online collaboration session in accordance with aspects of the present disclosure.

A series of samples collected by the traffic analyzer 210 for an incoming data stream associated with an online collaboration session may be as shown in FIG. 4. The samples 408a-408n may be collected at a predetermined collection interval or sampling rate. The collection interval may be set by a user or predetermined by the traffic analyzer 210 or other device or system. For example, the collection interval may be every two (2) seconds, every 30 seconds, every minute, every 100 milliseconds, etc. At each collection interval, the traffic analyzer 210 collects data stream characteristics for some sampling duration. Similar to the collection interval, the sampling duration may be set by a user or predetermined by the traffic analyzer 210 or other device or system. For example, the sampling duration may be one (1) second, 30 milliseconds, 100 milliseconds, etc. Generally, the sampling duration is shorter than the collection interval.

During the sampling interval, the traffic analyzer 210 collects information about the packets in the data stream being sent from the user device 155 to the online collaboration service 208. This information or these characteristics can include one or more of, but is not limited to, the length of the packet, the number of packets, of a predetermined length, that are received during the sampling duration, the time the packets are received, etc. The collected information may be represented in FIG. 4 as a series of rows, having first data elements for length 412a, 412b, 412n. There may be more or fewer rows than those shown in FIG. 4, as represented by ellipses 424. In the example embodiment provided in FIG. 4, the rows provided for how many packets 416a, 416b, 416n, etc. of a particular length 412a, 412b, 412n, etc. are received during the sampling duration. Other characteristics of the data stream may be stored as metadata of the table 408 or in other columns (not shown).

Each sampling duration will have a separate set of data or table 408 created at a collection interval that falls along timeline 420. Thus, while the online collaboration session is ongoing, the analysis of the data stream and the collection of data stream information 408 is ongoing, and, in at least some configurations, periodic. Thus, if the content type changes in a data stream, that change may be detected by the traffic analyzer 210. The tables 408 may also be represented graphically, as provided in FIGS. 5A and 5B.

Figure 5A:
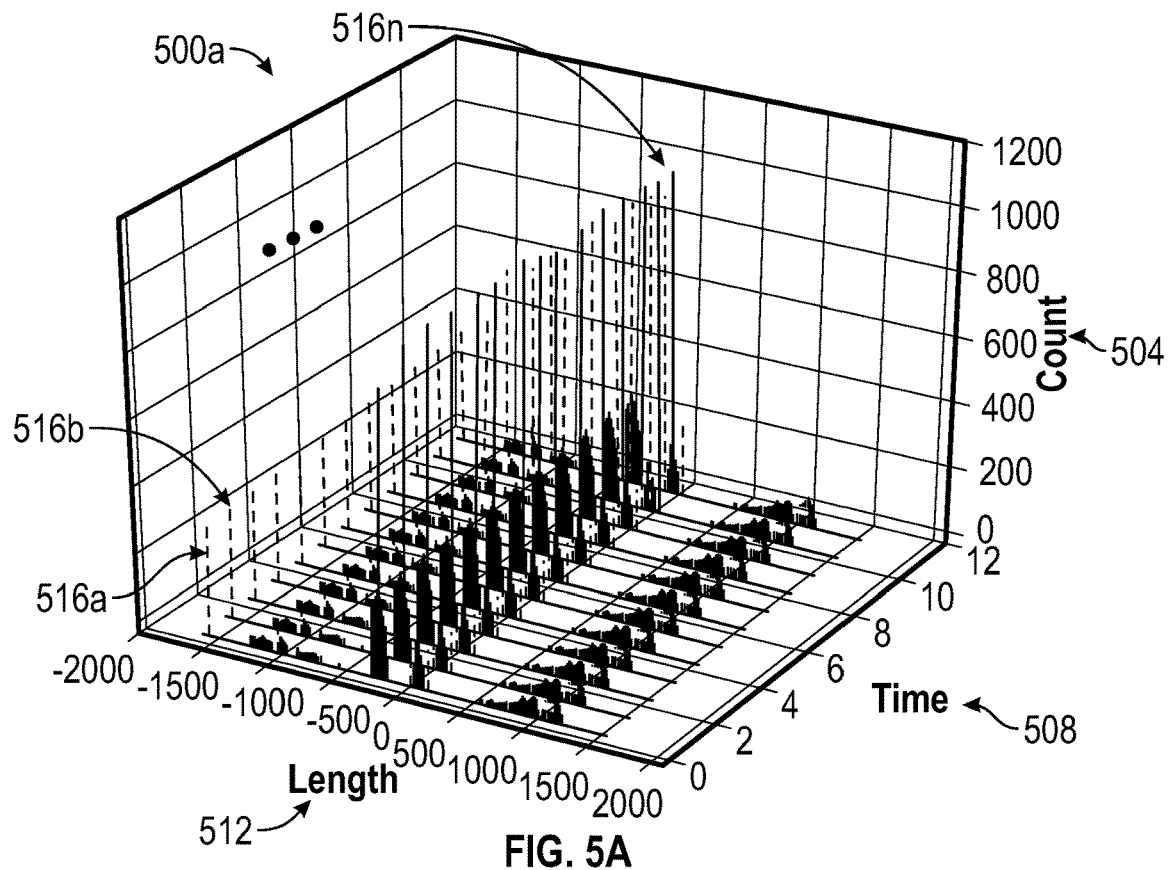
FIG. 5A shows a visual representation of a classification of data in an online collaboration in accordance with aspects of the present disclosure.

A graphical representation 500a of a first data stream may be as shown in FIG. 5A. The characteristics of the data stream may be represented by the length of the packets in the data stream, as provided on axis 512, the time at which the data stream was sampled, as provided on axis 508, and the number of packets of a predetermined length that were received during the sampling duration, as provided on axis 504. The characteristics 516a, 516b, 516n, etc. of each sampling duration may be shown at periodic intervals along axis 508. The characteristics 516 graphically represent the data stream during the sampling durations at each collection interval. As shown in FIG. 5A, the data stream has some large package sizes but there are not many packages being sent during each sampling interval. This type of data stream is indicative of text data, for example, user interface display 304 being transmitted from the user device 155 to the online collaboration server 105.

Figure 5B:
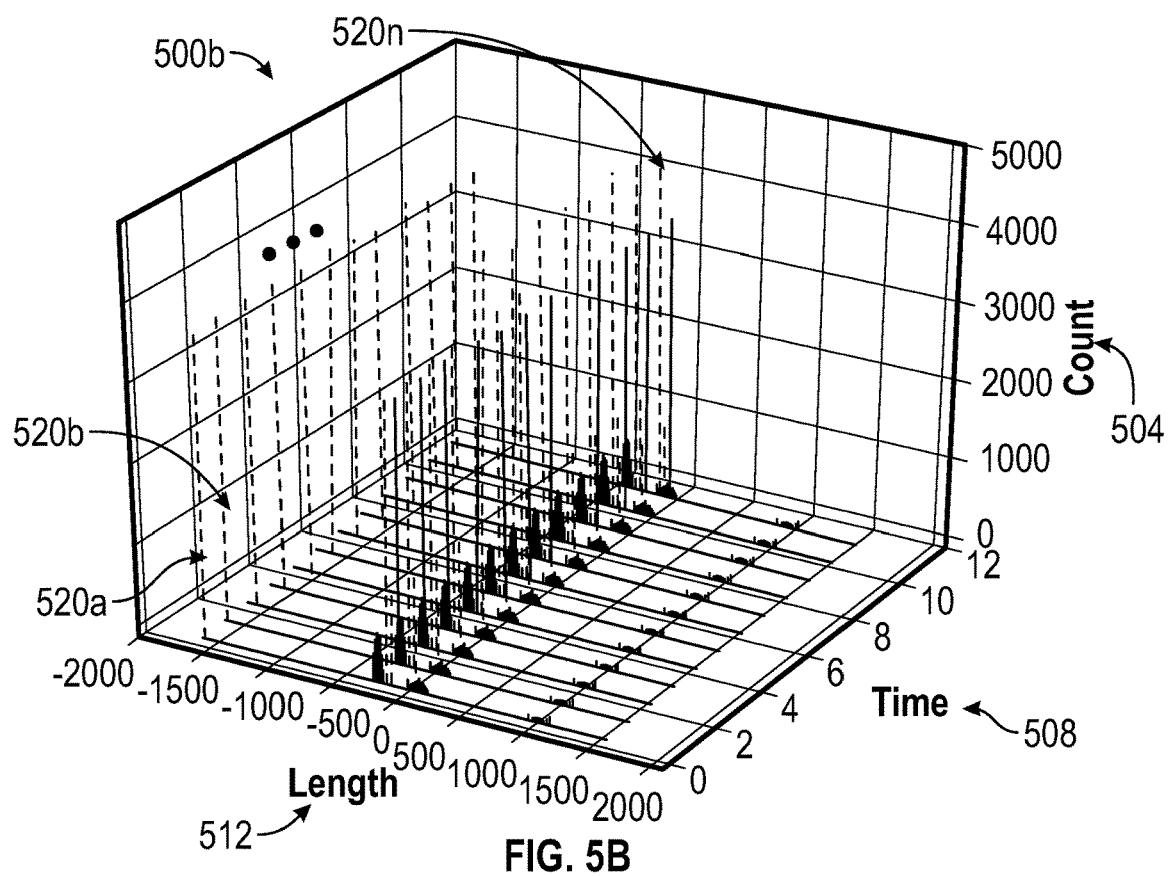
FIG. 5B shows another visual representation of a classification of data in an online collaboration in accordance with aspects of the present disclosure.

In contrast, another graphical representation 500b of a second data stream may be as shown in FIG. 5B. In this example, the characteristics 520a, 520b, 520n, etc. graphically represent a different data stream during the sampling durations at each collection interval. As shown in FIG. 5B, the data stream has large package sizes and there are many packages being sent during each sampling interval. This type of data stream is indicative of video data, for example, user interface display 316 being transmitted from the user device 155 to the online collaboration server 105.

Figure 6A:
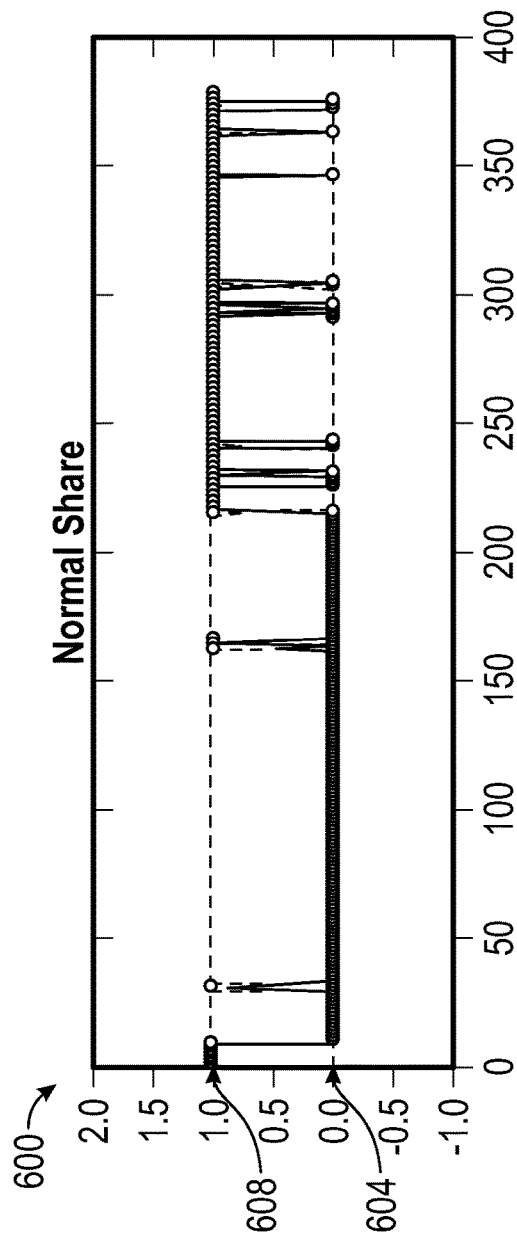
FIG. 6A shows a visual representation of classifications from an artificial intelligence (AI) process executing on the client device in accordance with aspects of the present disclosure.

Another graphical representation 600 of a first data stream may be as shown in FIG. 6A. In the representation 600, a value of "1" represents video data while a value of "0" represents text data. The representation 600 may be as collected by an AI agent executing at a client device that is scanning the user desktop to determine the type of content on the user interface display 304, 316. The beginning of the session appears to be video data but is actually a slide presentation that is being shuffled between slides quickly. The amount of change in the text data reduces over time and the AI agent is able to recognize the content type as text at that time. Later in the online collaboration session, the content type switches to video, as can be seen when the values change from more 0's to more 1's.

Figure 6B:
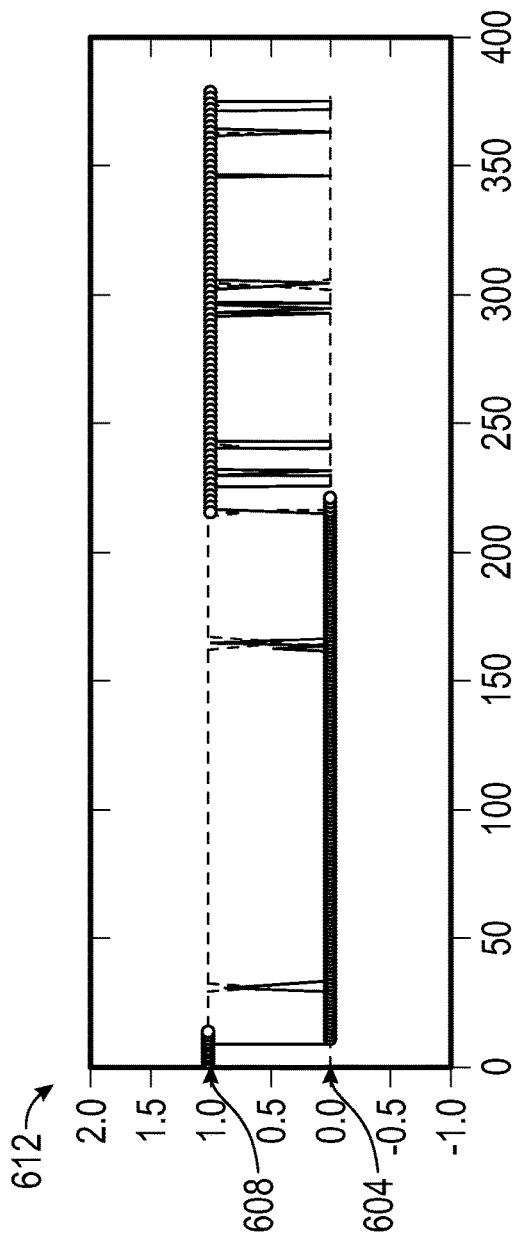
FIG. 6B shows a visual representation of classifications from the data stream classification process executing on the server in accordance with aspects of the present disclosure.

Yet another graphical representation 612 of a first data stream may be as shown in FIG. 6B. Similar to representation 600, in representation 612, a value of "1" represents video data while a value of "0" represents text data. The representation 612 may be as collected by the traffic analyzer 210 executing at the online collaboration server 105 that is scanning the incoming data stream from the user device 155 to determine the type of content in the data stream. Similar to what was identified by the AI agent mention above, the beginning of the session appears to be video data to the traffic analyzer 210 but is actually a slide presentation that is being shuffled between slides quickly. The amount of change in the text data reduces over time and the traffic analyzer 210 is also able to recognize the content type as text at that time. Later in the online collaboration session, the content type switches to video, as can be seen when the values change from more 0's to more 1's, which is also identified by the traffic analyzer 210. Thus, the traffic analyzer 210 provides similar results to the AI agent but does not have the drawbacks of the AI agent.

Figure 7:
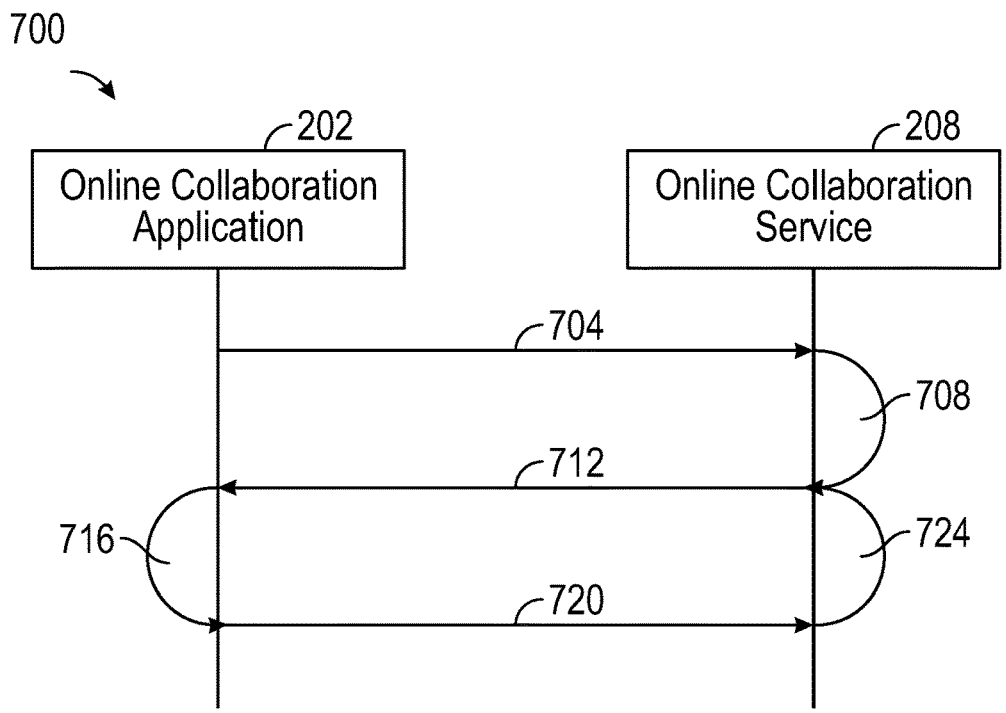
FIG. 7 shows a signaling diagram in accordance with aspects of the present disclosure.

FIG. 7 is a signalling diagram 700 that shows a least some of the communications between the user device 155 and the online collaboration server 105. The signals may be sent in various stages to provide the online collaboration session and to determine the content within the data stream sent from the user device 155 to the online collaboration server 105. A user device 155 can send the data stream in signal 704. This initial signal(s) 704 can provide the initial characteristics about the data stream and may be used to train the traffic analyzer 210 of the online collaboration service 208. The traffic analyzer 210 may then analyze the incoming data stream to determine the likely content classification for the data in the data stream 704, in process 708. This process 708 may be as described hereinafter in conjunction with FIGS. 9-10B. The results of the content classification or a directive on how to change the encoder settings may then be sent, by the traffic analyzer 210, back to the local encoder 206 in signal 712.

From the information in signal 712, the local encoder 206 can adjust the settings, in process 716, to better process the outgoing data stream. The ongoing data stream is then sent as signal 720 as processed with the new encoder settings. The content classification in signal 720 may change based on content or other changes in the online collaboration session. As such, a change in the content classification may be detected by the traffic analyzer 210 in process 724, where the traffic analyzer 210 can send different information in signal 712 to adjust again the encoder settings based on the change in content classification. Thus, this signalling process may repeat during the online collaboration session until the online collaboration session ends.

Figure 8A:
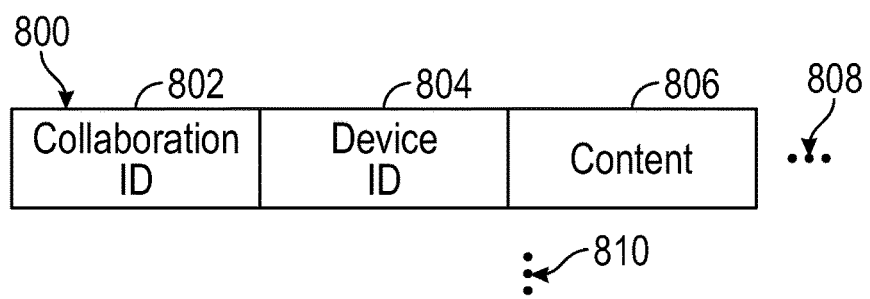
FIG. 8A shows a data structure stored, sent, received, or retrieved to classify content in an online collaboration session in accordance with aspects of the present disclosure.

FIG. 8A is a data structure 800 that may be an example of the data included in signal 704 or signal 720. The data structure 800 can include one or more of, but is not limited to, a collaboration Identifier (ID) 802, device ID 804, and/or content 806. The data structure 800 can include more or fewer fields than those shown in FIG. 8A, as represented by ellipses 808. Further, each user device 155, involved in the online collaboration session, can send a data structure 800, and thus, there may be more data structures provided to the online collaboration service 208 than that shown in FIG. 8A, as represented by ellipses 810, based on the number of user devices 155 in the online collaboration session.

The collaboration ID 802 can represent any type of identifier that uniquely identifies the online collaboration session. Thus, the collaboration ID 802 can be a numeric ID, and alphanumeric ID, an Internet Protocol (IP) address, a Media Access Control (MAC) address, or some other address or ID used by the online collaboration server 105 to the receive signal 704 and send the signal 712 to the user device 155 and to recognize which online collaboration session is associated with the data stream.

The device ID 804 can represent any type of identifier that uniquely identifies the user device 155 from other devices in the online collaboration session. Thus, the device ID 804 can be a numeric ID, and alphanumeric ID, an Internet Protocol (IP) address, a MAC address, a phone number, or some other address or ID used by the online collaboration server 105 to identify the user device 155 for classifying content with the data stream from the user device 155 sent to the online collaboration server 105.

The content 806 can include any data, associated with the online collaboration session, sent between the user devices 155. Thus, the content 806 can include audio, video, text, multimedia, etc. data that represents what is being shared between the user devices 155. The content 806 may be classified by the traffic analyzer 210 based on the signal characteristics of the data stream.

Figure 8B:
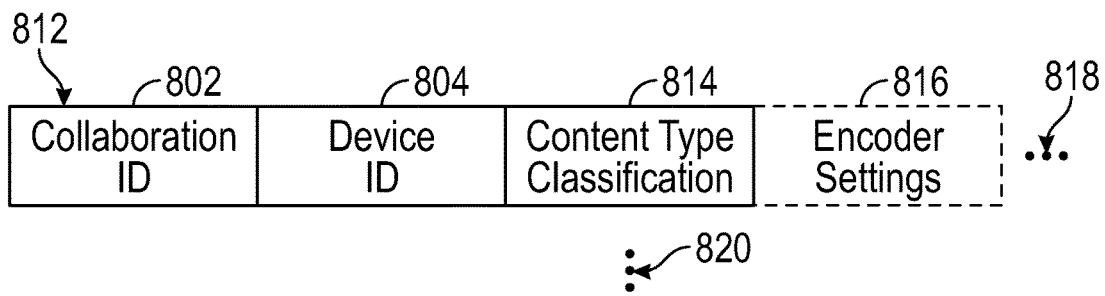
FIG. 8B shows another data structure stored, sent, received, or retrieved to classify content in an online collaboration session in accordance with aspects of the present disclosure.

FIG. 8B is another data structure 812 that may be an example of the data included in signal 712. The data structure 812 can include one or more of, but is not limited to, the collaboration ID 802, the device ID 804, a content type classification 814, and/or, optionally, encoder settings 816. The data structure 812 can include more or fewer fields than those shown in FIG. 8B, as represented by ellipses 818. Further, each user device 155, involved in an online collaboration session, can send a data structure 812, and thus, there may be more data structures provided than that shown in FIG. 8B, as represented by ellipses 820. The collaboration ID 802 and device ID 804 may be as previously described with data structure 800, and thus, will not be explained further.

The content type classification 814 is a classification or determination of the type of content in the content field 806, associated with data structure 800 sent during the online collaboration session, between the user devices 155. Thus, the content type classification 814 can include a classification of audio, video, text, multimedia, etc. that indicates what is being shared between the user devices 155 in each incoming data stream. The content type classification 814 may be generated by the traffic analyzer 210 based on the signal characteristics of the data stream.

Optionally, the traffic analyzer 210 can create encoder settings 816 for each local encoder 206 at each user device 155 involved in the online collaboration session. These settings can effect packet sizes, framerates, and other encoder settings. The local encoders 206 can implement the encoder settings 816 to change how the outgoing signal from the user device 155 is processed. In this way, the online collaboration server 105 can change how the data stream traffic during an online collaboration session is sent and what effect that data traffic may have on the network 140 or the online collaboration server 105.

Figure 9:
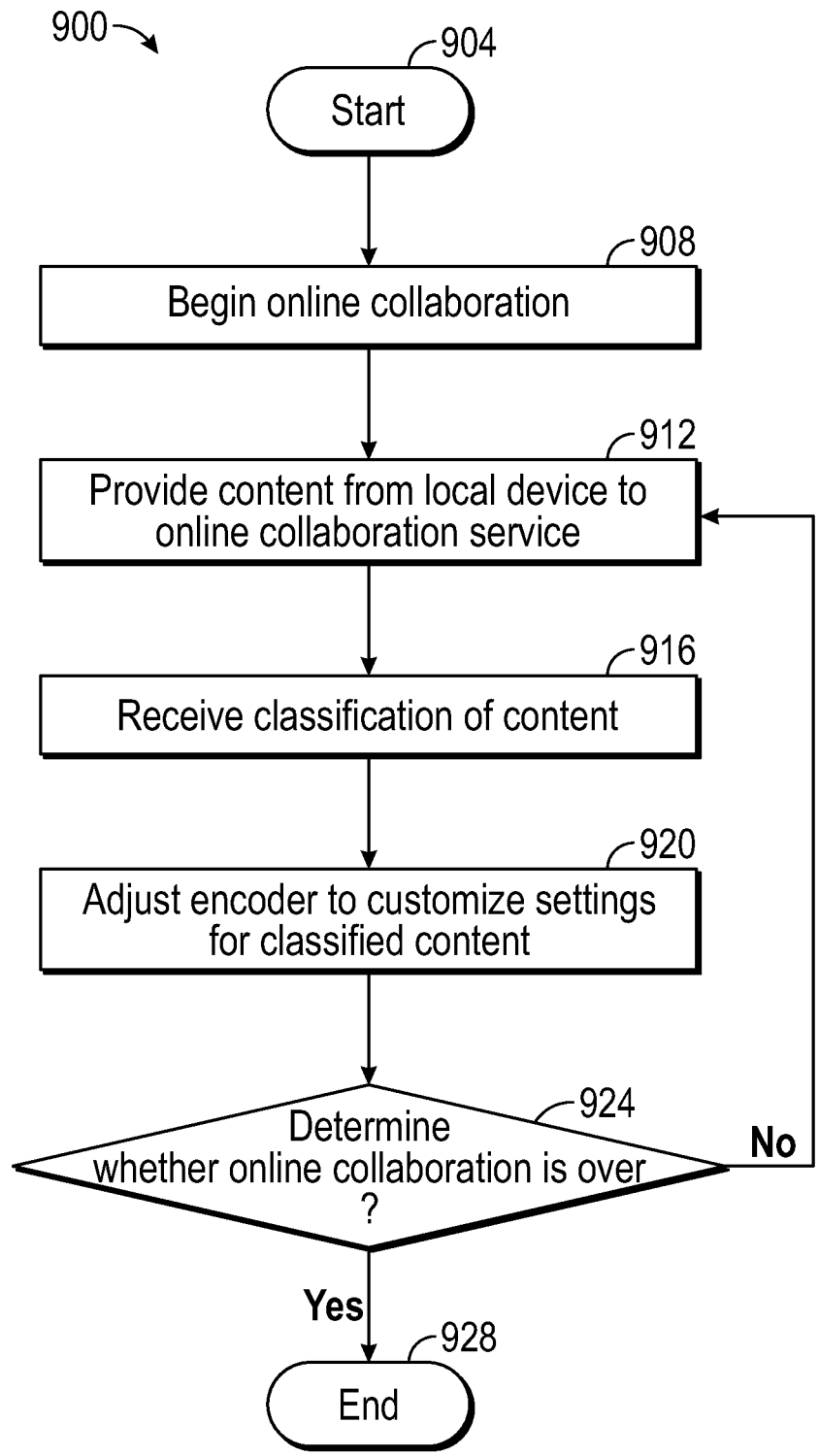
FIG. 9 shows a method, conducted by the online collaboration application on the client, for classifying content in an online collaboration session in accordance with aspects of the present disclosure.

An embodiment of a method 900, as conducted by the user device 155, for adjusting the settings of a used device 155 based on a content classification may be as shown in FIG. 9. A general order for the stages of the method 900 is shown in FIG. 9. Generally, the method 900 starts with a start operation 904 and ends with an end operation 928. The method 900 can include more or fewer stages or can arrange the order of the stages differently than those shown in FIG. 9. The method 900 can be executed as a set of computer-executable instructions executed by a computer system and encoded or stored on a computer readable medium. Further, the method 900 can be performed by gates or circuits associated with a processor, an Application Specific Integrated Circuit (ASIC), a Field Programmable Gate Array (FPGA), a System-On-Chip (SOC), or other hardware device. Hereinafter, the method 900 shall be explained with reference to the systems, components, devices, modules, software, data structures, data characteristic representations, signalling diagrams, methods, etc. described in conjunction with FIGS. 1-8 and 10A-11.

The online collaboration application 202, of the user device 155, can begin an online collaboration session, in stage 908. Thus, the online collaboration application 202 receives user input through the user interface 204 to connect to the online collaboration service 208 with one or more other user devices 155 in a group of devices 135. The online collaboration application 202 may then generate the user interface 204 for the online collaboration session and instantiate or start the local encoder 206. The user may then indicate data to be shared in the online collaboration session. The indicated data is then provided, as content 806 in data structure(s) 800. The data structure(s) 800 is converted by the local encoder 206 into signal 704 (the data stream), which is sent to the online collaboration service 208, in stage 912.

Figure 10A:
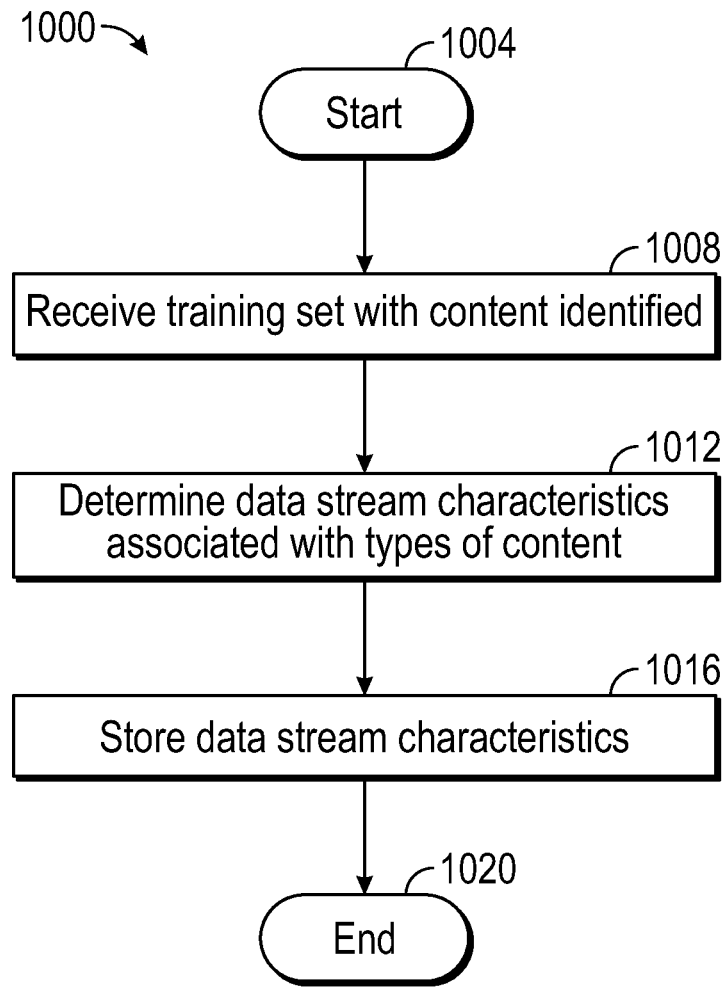
FIG. 10A shows a method, conducted by the traffic analyzer on the server, for determining classification types associated with online collaboration sessions in accordance with aspects of the present disclosure.
Figure 10B:
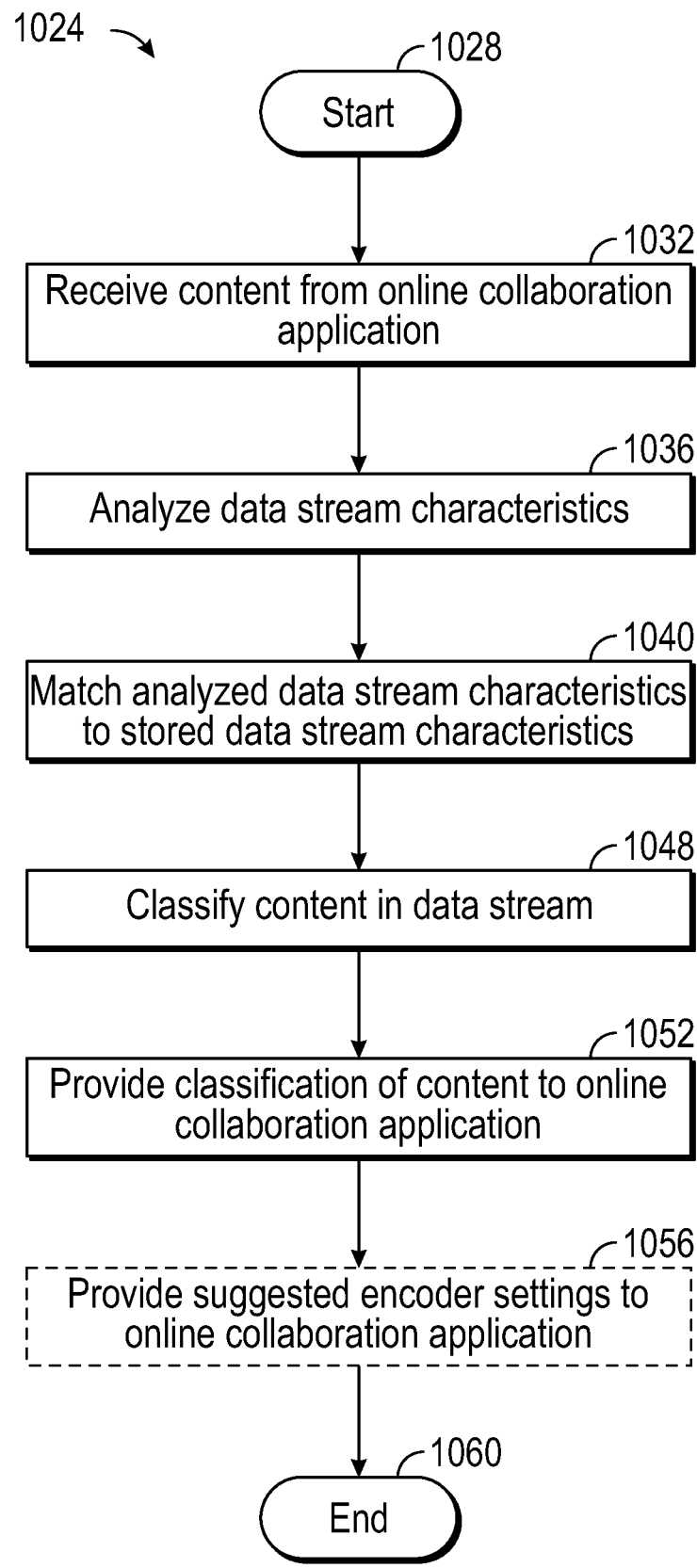
FIG. 10B shows a method, conducted by the traffic analyzer on the server, for classifying content in an online collaboration session in accordance with aspects of the present disclosure.

The online collaboration service 208 may analyze this data stream 704 as described in conjunction with FIG. 10B. Thereinafter, the local encoder 206 can receive the content type classification 814, contained in data structure 812. The data structure 812 may be contained in signal 712 sent from the online collaboration service 208, in stage 916. Optionally, the signal 712 can additionally or alternatively include encoder settings 816. Based on the information 814, 816 in the data structure 812, the local encoder 206 can adjust the settings to customize the conversion of the data from the online collaboration application 202, based on the type of content, in stage 920. Thus, the local encoder 206 can enforce an encoder policy to provide video at a high framerate but lower resolution and text or other static data at a lower framerate but at a higher resolution. This customization maximizes data throughput while meeting the user's need for an appealing user interface.

Thereinafter, the online collaboration application 202 can determine if the online collaboration session is over, in stage 924. The online collaboration application 202 can await a user input into the user interface 204 or other signal that indicates the online collaboration session has ended. If no input or signal has been received, the method 900 can proceed "NO" back to stage 912 to continue to provide content. If a user input or signal has been received, the method 900 can proceed "YES" to end operation 928.

An embodiment of a method 1000, as conducted by an online collaboration server 105, for training a traffic analyzer 210 to classify content in an incoming data stream, may be as shown in FIG. 10A. A general order for the stages of the method 1000 is shown in FIG. 10A. Generally, the method 1000 starts with a start operation 1004 and ends with an end operation 1020. The method 1000 can include more or fewer stages or can arrange the order of the stages differently than those shown in FIG. 10. The method 1000 can be executed as a set of computer-executable instructions executed by a computer system and encoded or stored on a computer readable medium. Further, the method 1000 can be performed by gates or circuits associated with a processor, an ASIC, a FPGA, a SOC, or other hardware device. Hereinafter, the method 1000 shall be explained with reference to the systems, components, devices, modules, software, data structures, data characteristic representations, signalling diagrams, methods, etc. described in conjunction with FIGS. 1-9 and 10B-11.

The traffic analyzer 210 of the online collaboration server 105 can receive a training data set with the content within the data stream identified, in stage 1008. The traffic analyzer 210 can include an AI agent that determines the classification of the content 806. The AI agent algorithm can be trained on a set of data streams having known content. The training set may be as stored in data store 125. In some configurations, an AI agent at the client can identify the data in the data stream as the data is sent to the traffic analyzer 210 for training. Thus, there is no need to store a training set in this configuration as the pre-identified content in the data stream functions as the training set.

Regardless, the AI agent algorithm of the traffic analyzer 210 can analyze the data stream to determine data stream characteristics associated with the types of content identified in the training set, in stage 1012. Thus, the AI agent algorithm conducts an analysis of the training set to form the data sets shown in FIGS. 4-6B. As more training data is reviewed, the AI agent algorithm can become more confident in the characteristics of the types of content (e.g., package size, number of packets of a predetermined size, timing of the packets, etc.). The characteristics of each type of content can then be stored as a profile to be used latter by the traffic analyzer 210, in stage 1016. The profiles or characteristics may be stored in the data store 125.

An embodiment of a method 1024, as conducted by an online collaboration server 105, for determining the classification of content in an incoming data stream may be as shown in FIG. 10B. A general order for the stages of the method 1024 is shown in FIG. 10B. Generally, the method 1024 starts with a start operation 1028 and ends with an end operation 1060. The method 1024 can include more or fewer stages or can arrange the order of the stages differently than those shown in FIG. 10B. The method 1024 can be executed as a set of computer-executable instructions executed by a computer system and encoded or stored on a computer readable medium. Further, the method 1024 can be performed by gates or circuits associated with a processor, an ASIC, a FPGA, a SOC, or other hardware device. Hereinafter, the method 1024 shall be explained with reference to the systems, components, devices, modules, software, data structures, heat maps, methods, etc. described in conjunction with FIGS. 1-10A and 11.

The online collaboration service 208, executing on the online collaboration server 105, can receive content 806 from online collaboration applications 202 executing on two or more user devices 155, in stage 1032. The content 806 may be part of a data structure 800 (e.g., a data packet) sent in signal 704. A traffic analyzer 210, on the frontend of the online collaboration server 105, can analyze the data stream characteristics, in stage 1036. The traffic analyzer 210 may sample the data stream at predetermined collection intervals, for example, every two (2) seconds. Each sample can have a sample duration, for example, 100 milliseconds. The characteristics obtained during the sampling may be the same or similar to the data 408 described in FIG. 4. Graphical representations of the sampled data 500 may be as shown in FIG. 5A or 5B.

The traffic analyzer 210 may then compare the sampled data to the saved content characteristics generated in process 1000 and saved in data store 125, in stage 1040. The saved content classification with the closest match (e.g., having a confidence interval of 85% or greater) indicates the type of content in the current data stream 704. Based on the best match, the traffic analyser 210 can classify the content in the data stream, in stage 1048. Then, the traffic analyzer 210 can create the data structure 812 to send back to the online collaboration application(s) 202. The classification 814 may be sent in signal 712 and provided to the online collaboration application 202, in stage 1052. The local encoder 206 may receive the classification and adjust the encoder settings based on the classification, as described in conjunction with FIG. 9. Alternatively or additionally, the traffic analyzer 210 can provide suggested encoder settings 816 to the online collaboration application 202, in optional stage 1056. With the encoder settings, the local encoder 206 need not have the logic to determine how to adjust the encoder based on the content type classification 814.

Figure 11:
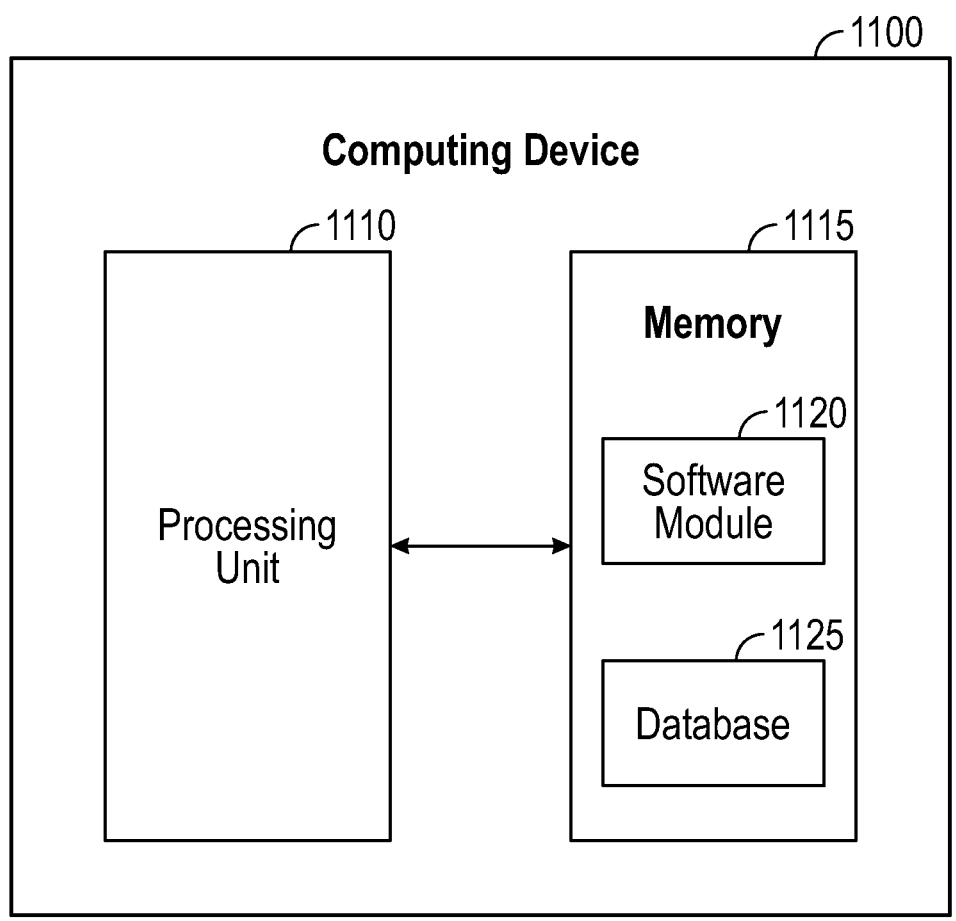
FIG. 11 shows a block diagram of a computer or computing device for conducting or executing the methods and processes for classifying content in an online collaboration session in accordance with aspects of the present disclosure.

FIG. 11 shows computing device 1100. As shown in FIG. 11, computing device 1100 may include a processing unit 1110 and a memory unit 1115. Memory unit 1115 may include a software module 1120 and a database 1125. While executing on processing unit 1110, software module 1120 may perform, for example, processes for determining content types at an online collaboration server 105 and sending that information to an online collaboration application at a client to adjust the client's encoding of the data stream, including for example, any one or more of the stages from method 900, method 1000, or method 1024 described above with respect to FIG. 9, FIG. 10A, and FIG. 10B. Computing device 1100, for example, may provide an operating environment for elements of operating environment 100 including, but not limited to, online collaboration server 105 and user device 155. Elements of operating environment 100 (e.g., online collaboration server 105 and user device 155) may operate in other environments and are not limited to computing device 1100.

Computing device 1100 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 1100 may comprise any computer operating environment, such as hand-held devices, multi-processor systems, microprocessor-based or programmable sender electronic devices, minicomputers, mainframe computers, and the like. Computing device 1100 may also be practiced in distributed computing environments where tasks are performed by remote processing devices. The aforementioned systems and devices are examples and computing device 1100 may comprise other systems or devices.

Accordingly, aspects of the present disclosure comprise a method comprising: receiving a data stream associated with an online collaboration session; analyzing the data stream to determine a signal characteristic; based on the signal characteristic, generating a classification of a type of content in the data stream; and sending the classification to an online collaboration application that generated the data stream to adjust encoding of the data stream.

Any of the one or more above aspects, wherein the type of content is one of text, audio, video, or multimedia.

Any of the one or more above aspects, wherein the online collaboration session is conducted between two or more user devices, which share data between the two or more user devices.

Any of the one or more above aspects, wherein the data stream is received at an online collaboration service executed by an online collaboration server.

Any of the one or more above aspects, wherein the online collaboration service manages the data stream from each of the two or more user devices to provide the online collaboration session.

Any of the one or more above aspects, wherein a traffic analyzer executed at the online collaboration server analyses the data stream.

Any of the one or more above aspects, wherein the traffic analyzer is executed at a frontend of the online collaboration server.

Any of the one or more above aspects, wherein the signal characteristic comprises one or more of a packet size and/or a number of packets of a predetermined size received.

Any of the one or more above aspects, wherein the data stream is analyzed at a collection interval and over a sampling duration.

Any of the one or more above aspects, wherein the number of packets received is over the sampling duration.

Aspects of the present disclosure may also comprise a method comprising: beginning, with an online collaboration application, an online collaboration session between a first user device and a second user device, wherein the first user device executes the online collaboration application; providing, by the online collaboration application, content from the first user device to an online collaboration service, executed at an online collaboration server, as a data stream; receiving a classification of the content in the data stream; and based on the classification, modifying an encoder setting that changes a signal characteristic of the data stream.

Any of the one or more above aspects, wherein the encoder setting changes one or more of a framerate and/or a data resolution.

Any of the one or more above aspects, wherein the classification is one of text, audio, video, or multimedia.

Any of the one or more above aspects, further comprising: receiving a second classification at a later time based on a change in the content being sent in the data stream; and modifying again the encoder settings to again change the signal characteristic of the data stream.

Any of the one or more above aspects, wherein the content is shared from a user interface of or by user input into the online collaboration application.

Aspects of the present disclosure may also comprise an online collaboration server comprising: a memory storage; a processing unit coupled to the memory storage, wherein the processing unit to: execute an online collaboration service to conduct an online collaboration session between two or more user devices; execute a traffic analyzer at a frontend before processing the online collaboration session, the traffic analyzer to: receive a data stream associated with the online collaboration session; analyze the data stream to determine a signal characteristic; based on the signal characteristic, generate a classification of a type of content in the data stream; and send the classification to an online collaboration application of one of the user devices that generated the data stream to adjust encoding of the data stream.

Any of the one or more above aspects, wherein the type of content is one of text, audio, video, or multimedia.

Any of the one or more above aspects, wherein the signal characteristic comprises one or more of a packet size and/or a number of packets of a predetermined size received.

Any of the one or more above aspects, wherein the traffic analyzer further to determine one or more signal characteristics that identify the type of content.

Any of the one or more above aspects, wherein the traffic analyzer determines the one or more signal characteristics that identify the type of content based on analyzing a training set of data streams.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a Random Access Memory (RAM), a read-only memory (ROM), an Erasable Programmable Read-Only Memory (EPROM or Flash memory), an optical fiber, and a portable Compact Disc Read-Only Memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' steps or stages may be modified in any manner, including by reordering steps or stages and/or inserting or deleting steps or stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a SOC where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, at an online collaboration server, a data stream associated with an online collaboration session from a user device;
   analyzing, at the online collaboration server, the data stream to determine a signal characteristic, wherein analyzing the data stream to determine the signal characteristic comprises analyzing the data stream at a collection interval and over a sampling duration, and wherein analyzing the data stream at the collection interval and over the sampling duration further comprises:
      determining a packet size of packets received over the sampling duration, and
      determining a packet count per packet size received over the sampling duration;
   generating, at the online collaboration server based on the packet size and the packet count per packet size, a classification of a type of content in the data stream, wherein generating the classification of the type of content in the data stream comprises generating the classification of the type of content in the data stream based on the packet size and the packet count per packet size as one of the following: a video stream, an audio stream, a text stream, and a multimedia stream; and
   sending the classification to an online collaboration application of the user device that generated the data stream to adjust encoding of the data stream.

2. The method of claim 1, wherein the online collaboration session is conducted between two or more user devices, which share data between the two or more user devices.

3. The method of claim 2, wherein the data stream is received at an online collaboration service executed by the online collaboration server.

4. The method of claim 3, wherein the online collaboration service manages the data stream from each of the two or more user devices to provide the online collaboration session.

5. The method of claim 4, wherein a traffic analyzer executed at the online collaboration server analyzes the data stream.

6. The method of claim 5, wherein the traffic analyzer is executed at a frontend of the online collaboration server.

7. The method of claim 1, wherein the signal characteristic further comprises a packet size and a number of packets, of a predetermined size, received.

8. The method of claim 1, further comprising:
   determining a second classification at a later time based on a change in the content being received in the data stream; and
   sending the second classification to the online collaboration application of the user device.

9. The method of claim 1, further comprising:
   determining the signal characteristic that identify the type of content based on analyzing a training set of data streams.

10. A method comprising:
beginning, with an online collaboration application, an online collaboration session between a first user device and a second user device, wherein the first user device executes the online collaboration application;
providing, by the online collaboration application, a content from the first user device to an online collaboration service, executed at an online collaboration server, as a data stream;
receiving, by the online collaboration application, a classification of the content in the data stream, wherein receiving the classification of the content in the data stream comprises receiving the classification of the content in the data stream in response to:
    analyzing, at the online collaboration server, the data stream to determine a signal characteristic, wherein analyzing the data stream to determine the signal characteristic comprises analyzing the data stream at a collection interval and over a sampling duration, and wherein analyzing the data stream at the collection interval and over the sampling duration further comprises:
        determining a packet size of packets received over the sampling duration, and
        determining a packet count per packet size received over the sampling duration, and
    generating, at the online collaboration server based on the packet size and the packet count per packet size, the classification of a type of content in the data stream, wherein generating the classification of the type of content in the data stream comprises generating the classification of the type of content in the data stream based on the packet size and the packet count per packet size as one of the following: a video stream, an audio stream, a text stream, and a multimedia stream; and
based on the classification, modifying an encoder setting that changes a signal characteristic of the data stream.

11. The method of claim 10, wherein the encoder setting changes one or more of a framerate and/or a data resolution.

12. The method of claim 10, further comprising: receiving a second classification at a later time based on a change in the content being sent in the data stream; and modifying again the encoder setting to change again the signal characteristic of the data stream.

13. The method of claim 12, wherein the content is shared from a user interface of or by user input into the online collaboration application.

14. A system comprising:
a memory storage;
a processing unit coupled to the memory storage, wherein the processing unit to:
    execute an online collaboration service to conduct an online collaboration session between two or more user devices;
    execute a traffic analyzer at a frontend before processing the online collaboration session, the traffic analyzer to:
        receive a data stream associated with the online collaboration session from a user device of the two or more user devices;
        analyze the data stream to determine a signal characteristic, wherein the processing unit being operative to analyze the data stream to determine the signal characteristic comprises the processing unit being operative to analyze the data stream at a collection interval and over a sampling duration, and wherein the processing unit being operative to analyze the data stream at the collection interval and over the sampling duration further comprises the processing unit being operative to:
            determine a packet size of packets received over the sampling duration, and
            determine a packet count per packet size received over the sampling duration;
        generate, based on the packet size and the packet count per packet size, a classification of a type of content in the data stream, wherein the processing unit being operative to generate the classification of the type of content in the data stream comprises the processing unit being operative to generate the classification of the type of content in the data stream based on the packet size and the packet count per packet size as one of the following: a video stream, an audio stream, a text stream, and a multimedia stream; and
    send the classification to an online collaboration application of the user device.

15. The system of claim 14, wherein the signal characteristic further comprises a packet size and a number of packets of a predetermined size received.

16. The system of claim 14, wherein before receiving the data stream, the traffic analyzer further to determine one or more signal characteristics that identify the type of content.

17. The system of claim 16, wherein the traffic analyzer determines one or more signal characteristics that identify the type of content based on analyzing a training set of data streams.

18. The system of claim 14, wherein the traffic analyzer is executed at a frontend of an online collaboration server.

19. The system of claim 14, wherein the data stream is received at an online collaboration service executed by the online collaboration server.

20. The system of claim 19, wherein the online collaboration service manages the data stream from each of the two or more user devices to provide the online collaboration session.

\* \* \* \* \*